US010585615B1

(12) United States Patent
Kadam et al.

(10) Patent No.: US 10,585,615 B1
(45) Date of Patent: Mar. 10, 2020

(54) VIRTUAL FLASH SYSTEM

(71) Applicant: Seagate Technology LLC, Cupertino, CA (US)

(72) Inventors: Prasad Ramchandra Kadam, Pune (IN); Sachin Sudhir Jagtap, Pune (IN); Kedar Patankar, Pune (IN)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/976,056

(22) Filed: May 10, 2018

(51) Int. Cl.
*G06F 3/06* (2006.01)
*G06F 12/10* (2016.01)

(52) U.S. Cl.
CPC .......... *G06F 3/0647* (2013.01); *G06F 3/0616* (2013.01); *G06F 3/0659* (2013.01); *G06F 3/0664* (2013.01); *G06F 3/0679* (2013.01); *G06F 12/10* (2013.01); *G06F 2212/1044* (2013.01); *G06F 2212/7201* (2013.01)

(58) Field of Classification Search
CPC ...... G06F 3/0647; G06F 3/0679; G06F 12/10; G06F 3/0659; G06F 3/0616; G06F 3/0664; G06F 2212/1044; G06F 2212/7201; G06F 12/0246
See application file for complete search history.

(56) References Cited

U.S. PATENT DOCUMENTS

| 6,026,230 | A | 2/2000 | Lin et al. | |
|---|---|---|---|---|
| 7,495,970 | B1* | 2/2009 | Tang | G11C 29/028 326/39 |
| 7,607,005 | B1 | 10/2009 | Lewis | |
| 2003/0031052 | A1* | 2/2003 | Roohparvar | G11C 16/08 365/185.11 |
| 2008/0046638 | A1 | 2/2008 | Maheshwarl et al. | |
| 2008/0086588 | A1 | 4/2008 | Danilak et al. | |
| 2009/0049274 | A1 | 2/2009 | Norman | |
| 2014/0208000 | A1* | 7/2014 | Phelan | G06F 12/0246 711/103 |
| 2019/0130990 | A1 | 5/2019 | Liu | |

OTHER PUBLICATIONS

Cai et al, "Read Disturb Errors in MLC NAND Flash Memory: Characterization, Mitigation, and Recovery", Article from Carnegie Mellon and Seagate, 2015, 12 pages. https://users.ece.cmu.edu/~omutlu/pub/flash-read-disturb-errors_dsn15.pdf.

(Continued)

*Primary Examiner* — Tasnima Matin
(74) *Attorney, Agent, or Firm* — Setter Roche LLP; Christian W. Best

(57) ABSTRACT

An apparatus may include a virtual flash device configured to emulate a flash memory device. The virtual flash device may include a flash interface configured to communicate with a flash controller, an address translation module configured to translate memory addresses from a flash based memory space to another memory space of another memory, a metadata and control module configured to manage metadata from the emulation of the flash memory device, and a non-flash memory controller configured to communicate with the other memory.

19 Claims, 4 Drawing Sheets

(56) References Cited

OTHER PUBLICATIONS

Guo et al., "DPA: A data pattern aware error prevention technique for NAND flash lifetime extension", Presentation, Department of Electrical & Computer Engineering,University of Pittsburgh, Pittsburgh, Apr. 11, 2014, 23 pages. http://www.aspdac.com/aspdac2014/technical_program/pdf/7A-2.pdf.

Kim et al., "Flipping Bits in Memory Without Accessing Them: An Experimental Study of DRAM Disturbance Errors", Intel Labs, Carnegie Mellon University, 2014, 12 pages. https://users.ece.cmu.edu/~yoonguk/papers/kim-isca14.pdf.

Yamaga et al., "Real Usage-based Precise Reliability Test by Extracting Read/Write/Retention-Mixed Real-life Access of NAND Flash Memory from System-level SSD Emulator", Department of Electrical, Electronic, and Communication Engineering, Chuo University, Tokyo, Japan , 2017, 5 pages.

\* cited by examiner

VIRTUAL FLASH SYSTEM

SUMMARY

In some embodiments, an apparatus may include a virtual flash device configured to emulate a flash memory device. The virtual flash device may include a flash interface configured to communicate with a flash controller, an address translation module configured to translate memory addresses from a flash based memory space to another memory space of another memory, a metadata and control module configured to manage metadata from the emulation of the flash memory device, and a non-flash memory controller configured to communicate with the other memory.

In some embodiments, a device may include a virtual flash device configured to emulate a flash memory device, the virtual flash device including a field-programmable gate array (FPGA). The virtual flash device may include a flash interface configured to communicate with a flash controller, an address translation module configured to translate memory addresses from a flash based memory space to a memory space of a DDR SDRAM memory device, a flash wear module configured to modify data on a data path between the flash controller and the DDR SDRAM memory device to simulate data corruption caused by flash memory device behavior of a flash memory device, a metadata and control module configured to manage metadata from the emulation of the flash memory device, and a DDR SDRAM controller configured to communicate with the DDR SDRAM memory device.

In some embodiments, a method may include configuring a virtual flash device emulate a flash memory device, the virtual flash device including a FPGA and the virtual flash device including a flash interface configured to communicate with a flash controller and a DDR SDRAM controller configured to communicate with the DDR SDRAM memory device. The virtual flash device may then receive a read command from the flash controller, translating a memory address from a flash based memory space included in the read command to a memory space of a DDR SDRAM memory device, retrieving data from the DDR SDRAM memory device using the translated memory address, modifying the retrieved data to simulate data corruption caused by wear of a flash memory device, and outputting the modified data to the flash controller as a response to the read command.

DETAILED DESCRIPTION

Figure 1:
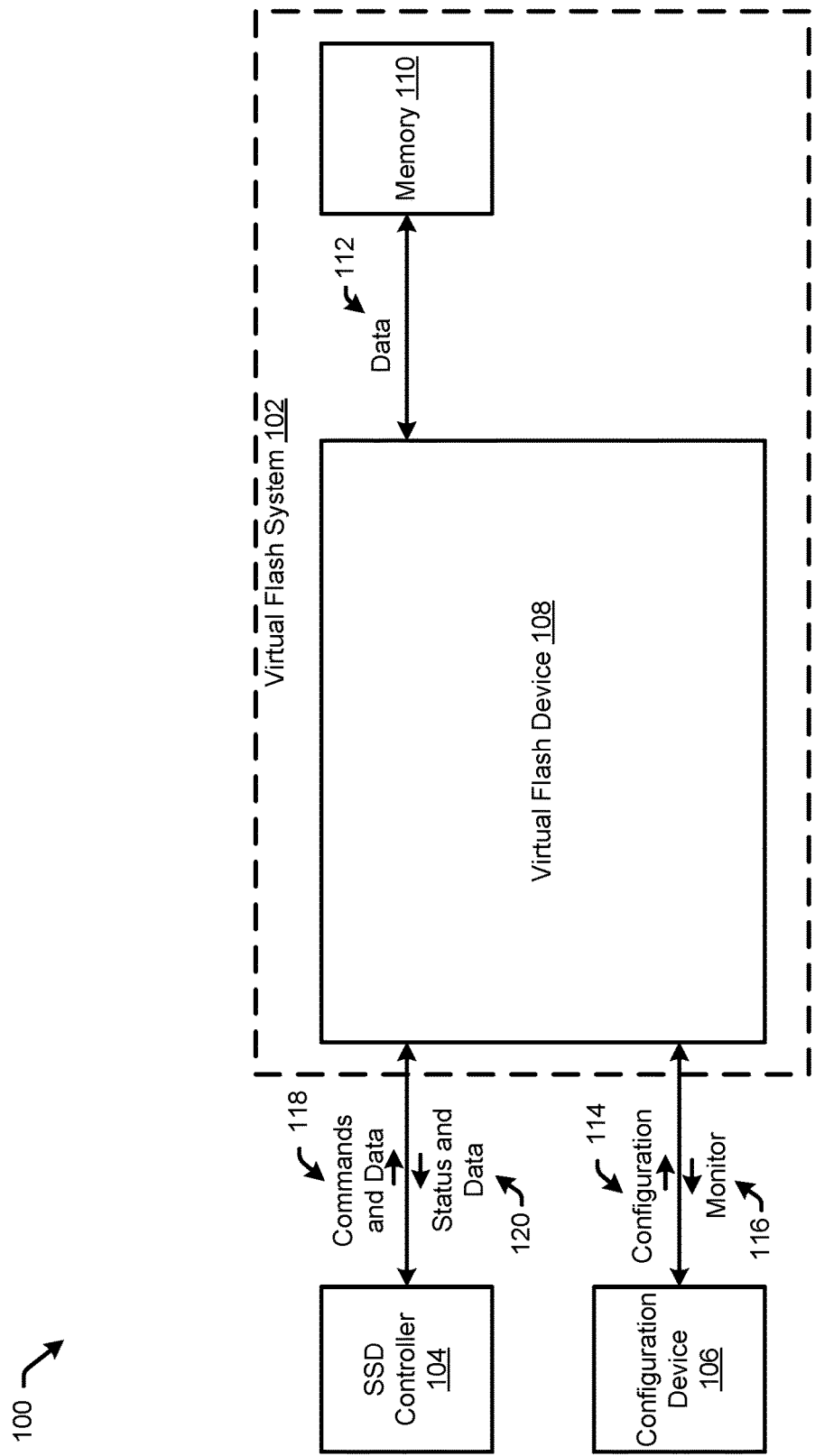
FIG. 1 is a block diagram is of a system that includes a virtual flash system that may emulate a flash storage device to a flash storage controller, in accordance with certain embodiments of the present disclosure.

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

The present disclosure generally relates to devices and systems for testing controllers, and in some embodiments, the present disclosure relates to devices and systems that may emulate a flash storage device to a flash storage controller to allow for testing of the operation of the flash storage controller.

Testing flash controllers using flash storage may require long test cycles as flash storage devices may take thousands of program and erase cycles before it wears out. Further issues may arise due to logistics involved in procuring suitably worn flash storage and attempting to track flash storage wear.

Some implementations of the technology described herein include a virtual flash system that may emulate a flash storage device including a variety of flash behavior. Some examples may include a programmable circuit which is connectable between a flash storage controller (e.g. an SSD controller) and a memory device (e.g. a DDR SDRAM memory). Some implementations may also avoid the above noted problems and other problems associated with the non-repeatable nature of flash due to its wear characteristics and real world variations.

For example, some implementations may simulate flash wear in a controllable manner, such that different behaviors or scenarios can be emulated. Such behaviors and scenarios may be provided in a predefined library of flash behavior and past scenarios that may be loaded into the virtual flash system to cause the virtual flash system to behave like a desired type of flash with specific behaviors or wear level. Such a library may allow testing of the flash controller for a wide variety of complex flash failures or a much wider range of flash behavior without dependency on a supply chain providing flash storage devices having the desired failures, wear or other conditions. Further, some implementations may also allow for a processor (e.g. a portion of the virtual flash system or external thereto) to check the correctness of program/erase (PE) or read (RD) counts, correctness of the bad block map after a test. Such implementations may greatly reduce the testing cycle (e.g. by an order of magnitude) while providing test results for a very broad and deep swathe of flash behavior which may enable early bug discovery and minimize or eliminate late breaking bad news.

Although the examples herein may be illustrated and described in the context of SSD controllers, this is merely for ease of discussion. Further, embodiments of the disclosed subject matter are not limited to this context. For example, the techniques and systems disclosed may be used with any flash storage controller similar to or which provide similar functionality to those of SSD controllers.

Referring to FIG. 1, a block diagram is shown of a system that includes a virtual flash system 102 that may emulate a flash storage device to a flash storage controller and which is generally designated 100. The components of system 100 may include a virtual flash system 102 coupled to a SSD controller 104 and a configuration device 106. Further, the virtual flash device 102 may include a virtual flash device 108 coupled to a memory 110. The virtual flash device 108 may connect to and emulate a flash storage device to the SSD controller 104 using the memory 110 as storage for data 112 that would otherwise be stored to the emulated flash storage device. The system 100 may further include a configuration device 106 that may be coupled to the virtual flash system 102 and may be operable to program or configure the virtual flash system 102. In some implementations, the form factor of the virtual flash system 102 may be configured to match the form factor of the flash storage device being emulated or a standard form factor for flash storage devices.

In operation, the configuration device 106 may send configuration information 114 to the virtual flash device 108 and receive monitor information 116 from the virtual flash device 108. For example, the configuration information 114 may include the type of flash storage device to be emulated, the condition of the flash storage device to be emulated, and what monitoring should be done, and so on.

The virtual flash device 108 may be capable of supporting many or all flash protocols and speed variants. For example, the virtual flash device 108 may to support some or all of the following flash protocols:
1. Asynchronous
2. ONFI2—Source Synchronous
3. ONFI3—NV DDR
4. ONFI3—NV DDR2
5. ONFI4—NV DDR
6. ONFI4—NV DDR2
7. Toggle2
8. Toggle3

The conditions to be emulated may include a flash wear model and other types of flash behavior such as inter-cell interference. The flash wear model may mimic flash wear behavior sufficiently to emulate different levels of wear from a brand-new flash and a totally worn out dead flash. In some examples, the flash wear model may be expressed as a formulaic transformation of data that may be implemented as the data 112 get written to or read from the memory 110. While some implementations may include functionality for emulating wear or failure conditions, other implementations may emulate the behavior of a flash storage device in good condition to allow for testing of flash storage controllers for normal operation. Such an example is shown and discussed with regard to FIG. 2 while an example implementation including functionality for emulating wear or failure conditions is shown and discussed with regard to FIG. 3.

As mentioned above, the virtual flash device 108 may return monitor information 116 to the configuration device 106. The specific information returned as monitor information may vary from implementation to implementation. For example, the monitor information may range from detailed metadata and complete system state dumps to very high level performance reports. In some examples, the monitor information may include PE or RD counts, a bad block map, and so on. Though not shown, additional monitor information may be received from the SSD controller.

Once the virtual flash device 108 has configured the system for operation, the SSD controller 104 may begin issuing commands (e.g. read, write, erase etc.) and write data 118 to the virtual flash device 108 while receiving status information and read data 120. As the interface between the SSD controller 104 and virtual flash device 108 is intended to emulate the communications between the SSD controller and the emulated flash storage device, one of ordinary skill in the art would understand the particulars of the communication in view of this disclosure.

The virtual flash device 108 may receive the configuration information 114 from the configuration device, configure the virtual flash system for operation and then connect to and emulate a flash storage device to the SSD controller 104 using the memory 110 as storage for data 112 that would otherwise be stored to the emulated flash storage device. The virtual flash device 108 may also provide monitor information 116 to the configuration device 106.

In some implementations, the virtual flash device 108 may operate such that all the processing for the write path and read path, along with the wear modeling and bookkeeping of meta-data is contained within the virtual flash device 108. In addition, the virtual flash device 108 may perform address translation between an emulated address space of the emulated flash storage device and an address space of the memory 110. In other words, such implementations may include a virtual flash device 108 which operates such that the SSD controller 104 operates as if connected to a normal flash storage device, the memory 110 has no specialized functionality, and the configuration device 106 may not need to be involved after providing configuration information (e.g. other than receiving any desired real time monitor information). However, configuration device 106 may input changes to the virtual flash device on the fly (e.g. instructing the virtual flash device 108 to introduce a new emulated failure on the fly, requesting the virtual flash device 108 dump the entire state of the virtual flash system 102, requesting the virtual flash device 108 provide different or additional monitor information, etc.).

In some implementations, the virtual flash device 108 may be a field-programmable gate array (FPGA). An FPGA may be integrated circuit designed to be configured by a customer or a designer after manufacturing (e.g. "field-programmable"). FPGAs may contain an array of programmable logic blocks, and a hierarchy of reconfigurable interconnects that may allow the blocks to be "wired together", like many logic gates that can be inter-wired in different configurations. Logic blocks may be configured to perform complex combinational functions, or simple logic gates like AND and XOR. In some FPGAs, logic blocks may also include memory elements, which may be simple flip-flops or more complete blocks of memory.

The memory 110 is not limited to a specific type of memory and may be any sufficiently fast digital storage. Some implementations may use a memory that does not exhibit wear (e.g. DDR SDRAM memory). In the case of using a DDR memory, multilevel cell flash and triple level cell flash can be emulated using two or three DDR SDRAM memory bits per flash cell, respectively.

Figure 2:
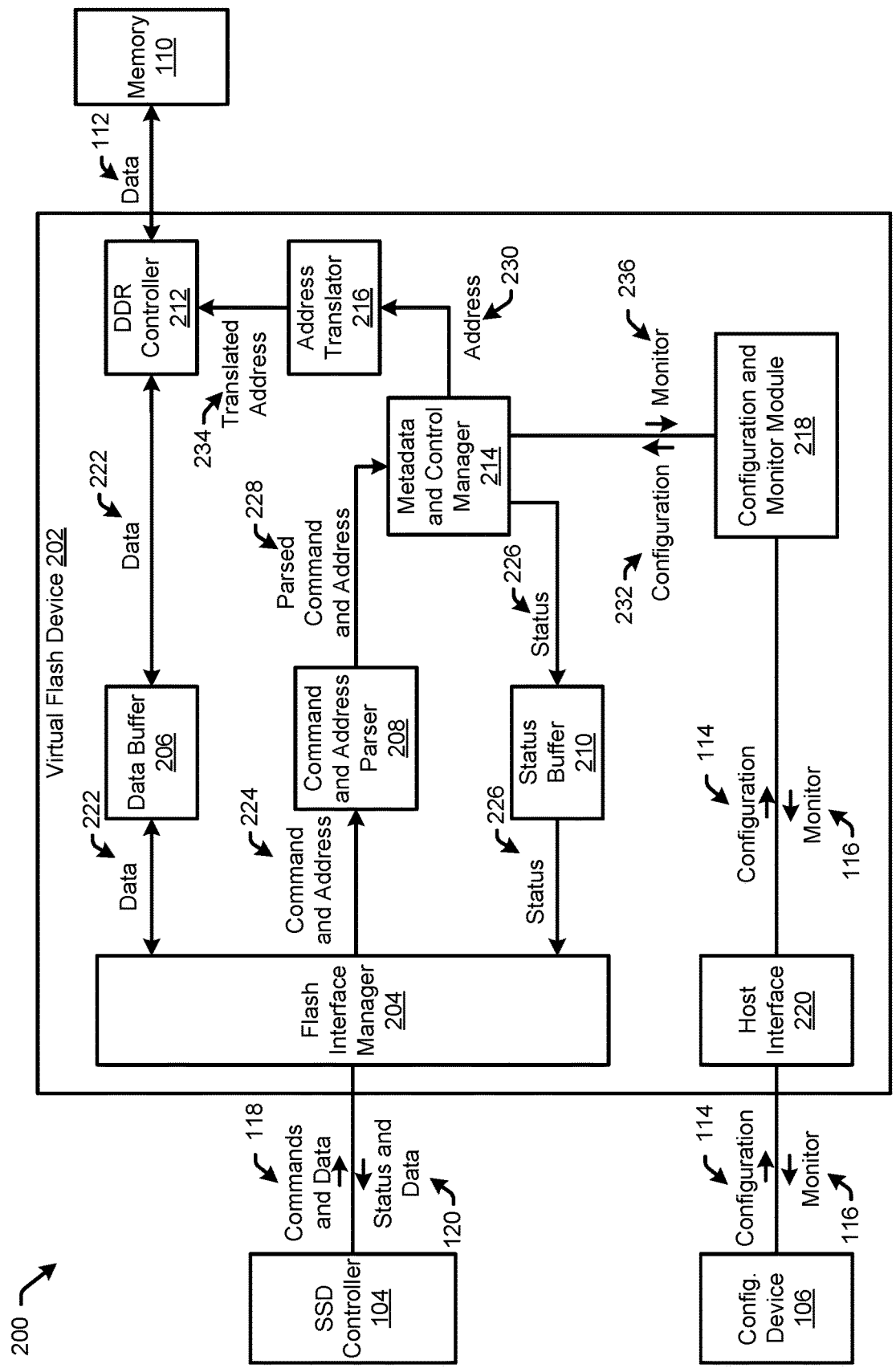
FIG. 2 is a block diagram is shown of a system that includes a virtual flash device that may emulate a flash storage device to the flash storage controller, in accordance with certain embodiments of the present disclosure.

Referring to FIG. 2, a block diagram is shown of a system that includes a virtual flash device 202 that may emulate a flash storage device to a flash storage controller and which is generally designated 200. More particularly, in the example system 200 illustrated in FIG. 2, the virtual flash device 202 may be an example of a type of virtual flash device that emulates the behavior of a flash storage device in good condition. Such implementations may be used for testing flash storage controllers for normal operation. Such testing using actual flash storage devices may suffer due to lack of knowledge of whether a failure was caused by bugs in the flash controller or the flash controller firmware or unknown wear or failure in the flash storage device. The components of the virtual flash device 202 may operate in a similar manner to the virtual flash device 108 discussed above with regard to FIG. 1. As such, discussion of the general functions of the virtual flash device 202 and a description of similar operations will not be repeated for sake of brevity.

The virtual flash device 202 may include a flash interface manager 204 that may interface with the SSD controller 104 and that may be coupled to a data buffer 206, a command and address parser 208, and a status buffer 210. The data buffer 206 may be coupled to a DDR controller 212 that may interface with the memory 110. The command and address parser 208 may be coupled to a metadata and control manager 214 which is in turn coupled to the status buffer 210, an address translator 216 and a configuration and monitor module 218. The address translator 216 may be coupled to the DDR controller 212. Finally, the configuration and monitor module 218 may be coupled to a host interface 220 that may interface with the configuration device 106.

In operation, the flash interface manager 204 may receive the commands and data 118 from the SSD controller 104. The flash interface manager 204 may provide the data portion of 118 to the data buffer 206 as data 222 and provide the command portion of 118 to the command and address parser 208 as command and address 224. Further, the flash interface manager 204 may receive read as data 222 from the data buffer 206 and status information 226 from the status buffer 210. The flash interface manager 204 may then output the received status and read data as status and data 120.

The data buffer 206 may operate as a buffer for the flash interface manager 204 and DDR controller 212. More particularly, the data buffer 206 may buffer write data from the SSD controller 104 until the associated command is processed and the DDR controller 212 is ready to output the write data to the memory 110. Similarly, the data buffer 206 may buffer read data from the memory 110 until the associated command is processed, associated status information 226 is prepared and the flash interface manager 204 is ready to output the status information and read data to the SSD controller 104. The status buffer 210 may operate in a similar manner as a buffer for the flash interface manager 204. For example, the status buffer 210 may buffer status information 226 until an associated read command is processed and the flash interface manager 204 is ready to output the status information 226 and associated read data to the SSD controller 104.

The command and address parser 208 may operate to receive the command and address 224 from the flash interface manager 204. The command and address parser 208 may then parse the command and address 224 from the format used by the SSD controller 104 into a parsed command and address 228 in a format usable by the metadata and control manager 214.

The host interface 220 may interface with the configuration device 106 and the configuration and monitor module 218. As such, the host interface may receive the configuration information 114 from the configuration device 106 and send the configuration information 114 to the configuration and monitor module 218. Further, the host interface 220 may receive monitor information 116 from the configuration and monitor module 218 and send the monitor information 116 data to the configuration device 106. The particular protocol used by the host interface when communicating with the configuration device 106 may vary. In some implementations, the host interface 220 may communicate with the configuration device 106 using an Ethernet interface.

The configuration and monitor module 218 may receive configuration information 114 from the host interface 220 and return monitor information 116 to the host interface 220. The configuration and monitor module 218 may utilize the configuration information 114 and generate an initial configuration for the virtual flash device 202. The initial configuration may be provided to the metadata and control manager 214 as configuration information 232. The configuration and monitor module 218 may receive monitor information 236 from the metadata and control manager 214. The monitor information 236 may be the same as monitor information 116 or may differ. Examples of monitor information 236 which differ from monitor information 116 may include raw monitor information, monitor information including additional internal information, monitor information in an alternative format, etc. In some implementations, the configuration and monitor module 218 may update the configuration information 232 during operation, for example, based on changes in the configuration information 114 during operation, based on the monitor information 236 and so on (e.g. instructing the virtual flash device 108 to introduce a new emulated failure on the fly, requesting the virtual flash device 108 dump the entire state of the virtual flash system 102, requesting the virtual flash device 108 provide different or additional monitor information, a determination that the metadata indicates a threshold has been reached, etc.). Additional discussion of a configuration and monitor module 218 updating the configuration information 232 based on monitor information 236 is provided below with regard FIG. 3.

The metadata and control manager 214 may receive the configuration information 232 from the configuration and monitor module 218. Based on the received configuration information 232, the metadata and control manager 214 may configure or program various components of the virtual flash device 202 to emulate the indicated flash storage device, to emulate any indicated flash behavior (e.g. wear, failure, etc.), to perform the internal operations to effect the emulation, and to perform the indicated monitoring. For example, the metadata and control manager 214 may configure the parsing operation of the command and address parser as well as the address translation operation of the address translator 216. In another example, the metadata and control manager 214 may configure the interface provided to the SSD controller 104 by the flash interface manager 204. More particularly, the flash interface manager 204 may implement a parametric ONFI2/3/4 or Toggle2/3 or Async device interface. The interface may be "parametric" in the sense that its behavior in terms of signal timing may be controllable via parameters. The metadata and control manager 214 may further configure the status information provided to the SSD controller 104 by the flash interface manager 204. Example status information that may be maintained by the flash interface manager 204 as part of the parametric interface may include an ONFIx/ToggleX status register, a read latency parameter, a device ready parameter, a device fail parameter, and a detection threshold. Of course, these examples are not limiting and the status information provided may vary based on the type of flash storage device being emulated (e.g. based on the standard or specifications of the emulated flash storage device).

During emulation, the metadata and control manager 212 may receive the parsed command and address 228 from the command and address parser 208. Based on the parsed command and address 228, the metadata and control manager 214 may operate to perform book-keeping of metadata for the virtual flash device 108. The metadata being stored may vary from implementation to implementation depending on the desired emulation scenario. For example, some implementations may include one or more of a list of all commands and respective addresses received by the virtual flash system with time stamps, what statuses were returned for those commands, and various counters (e.g. read cycle counters, program/erase cycle counters, etc.), and so on. Some example implementations may utilize such metadata for debugging SSD controller failures or to improve performance of the SSD controller. In some examples, the counters may be used cross check if firmware counters are working properly. The counters may also be used to check if all SSD algorithms like wear leveling are working as expected. A detailed example of the metadata is discussed with regard to FIG. 3. In addition, the metadata and control manager 214 may provide the address to the address translator 216.

The address translator 216 may operate to translate addresses between the addressing scheme of the indicated flash storage device to be emulated and the DDR memory addressing scheme.

The DDR controller 212 may operate to store data to and retrieve data from the memory 110. The memory address of the memory 110 the DDR controller stores data to or retrieves data from may be a translated address 234 from the address translator 216.

The virtual flash device 202 may include functionality to save and restore the current state of the virtual flash device 202 and memory 110 to the configuration device 106. For example, the configuration device 106 may initiate the save process as part of the configuration information sent to the virtual flash device 202 during an emulation operation. The configuration and monitor module 218 may receive the save request and issue instructions to various components of the virtual flash device 202 and the memory 110 to suspend operation and provide a copy of the current state of the components to the configuration and monitor module 218. Upon receiving the current state data, the configuration and monitor module 218 may return the current state data to the configuration device as monitor information 116. The operations of the virtual flash device 202 may then resume or remain suspended. Subsequently, a similar process may be utilized to restore the virtual flash device to the saved state.

Figure 3:
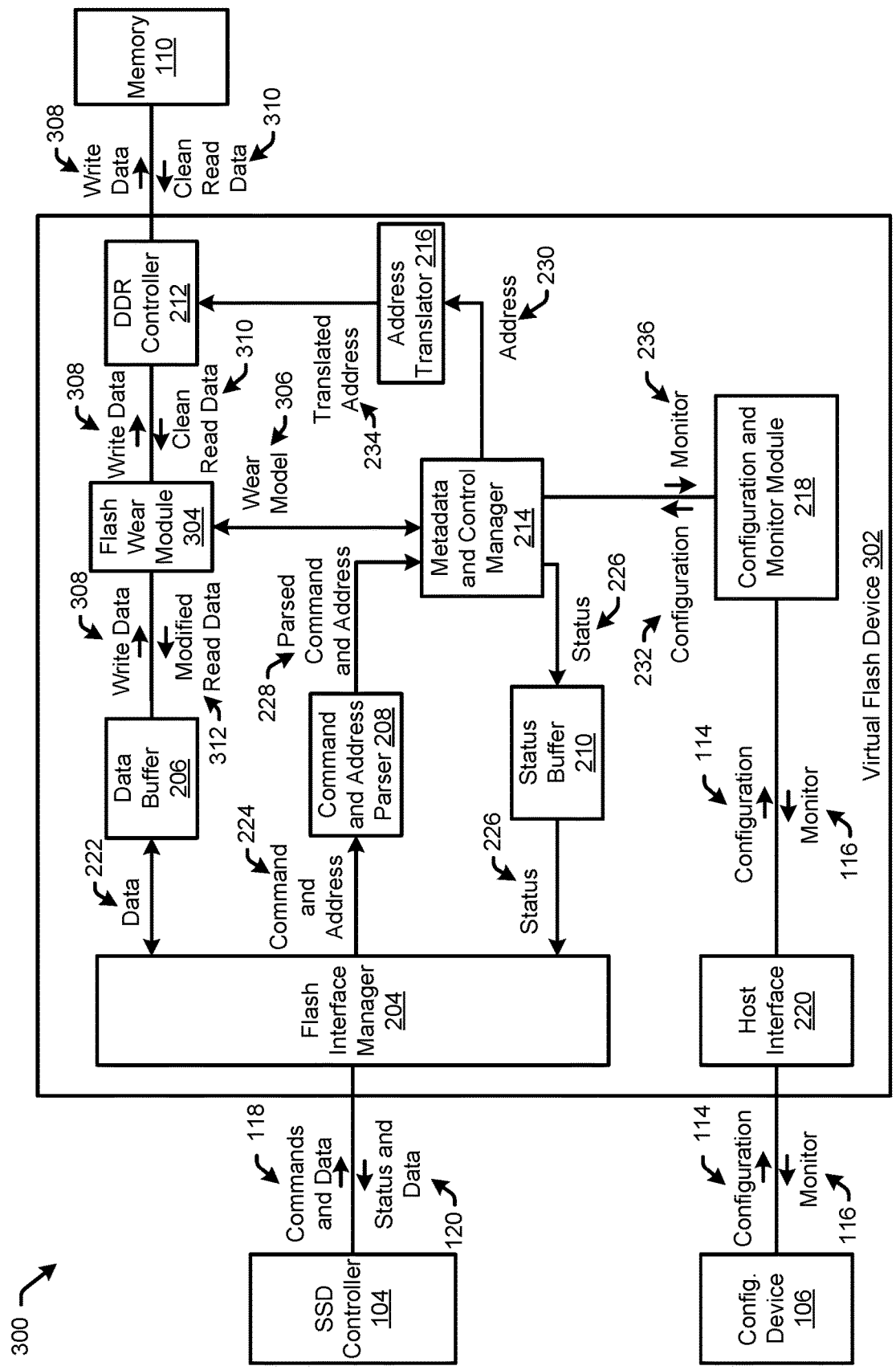
FIG. 3 is a block diagram of a system that includes a virtual flash device that may emulate a flash storage device to a flash storage controller, in accordance with certain embodiments of the present disclosure.

Referring to FIG. 3, a block diagram is shown of a system that includes a virtual flash device 302 that may emulate a flash storage device to the flash storage controller and which is generally designated 300. More particularly, in the example system 300 illustrated in FIG. 3, the virtual flash device 302 may be an example of a type of virtual flash device that emulates the behavior of a flash storage device with wear or other less than ideal conditions. Such implementations may be used for testing flash storage controllers for its ability to handle worn or partially failing flash storage devices. As discussed above, such testing using actual flash storage devices may suffer due to lack of repeatability and difficulty in obtaining suitable test flash storage devices. The components of the virtual flash device 302 may operate in a similar manner to the virtual flash devices 108 and 202 and discussed above with regard to FIGS. 1 and 2. As such, discussion of the general functions of the virtual flash device 302 and a description of similar operations will not be repeated for sake of brevity.

In addition to the components of the virtual flash device 202, the virtual flash device 302 may include a flash wear module 304. In the example illustrated in FIG. 3, the flash wear module 304 is positioned on the data path between the data buffer 206 and the DDR controller 212. The flash wear module 304 is also coupled to the metadata and control manager 214.

In operation, the metadata and control manager 214 may determine a wear model 306 based on the configuration information 232 and provide the wear model 306 to the flash wear module 304.

As discussed above, storing to or accessing the same location in a flash storage device repeatedly may result in wear. By a tailoring the wear model 306, the virtual flash device 302 may emulate flash storage devices with different levels of wear that may range from a brand-new flash storage device to a totally worn out dead flash storage device.

In some implementations, the wear model 306 may define wear on a per block or per page basis. For example, in some flash storage devices, wear may result from program and erase cycles. Because erase operations may be on a per block level and because overwriting any portion of a block may require the block be erased first, tracking the number of erases that have been performed on the block may provide a general estimate of the amount of wear that can be expected for that block and the pages within that block.

There are multiple ways of achieving the flash wear model 306. For example, a simple flash wear model 306 may define a bit mask for bits of each flash page. In such an example, the set bits (e.g. bits set to true) in the bit-mask may indicate that the bit should be treated as corrupted. As such, using such a bit mask, the flash wear module 304 may flip the bits masked as corrupt during either writes or reads. In the example, shown in FIG. 3, write data is stored in a clean form (e.g. the flash wear module 304 may pass write data 308 through to the DDR controller 212 and on to memory 110 for storage). During a read operation, the still clean data may read from memory 110 as clean read data 310 by the DDR controller 212. The flash wear module 304 may receive the clean read data 310 and apply the wear model 306 to generate modified read data 312 which simulates read data that may be returned from a flash storage device having wear characteristics defined by the wear model 306. However, implementations are not limited to storing clean data and applying the wear model 306 on the read path. In other implementations, the wear model may be applied to the write data such that modified write data is stored to the memory 110. In such implementations, the read path may pass the data read from the memory 110 through the flash wear module 304 without modification.

Continuing the above example, the configuration and monitor module 218 may include a number of predefined flash wear levels. As such, each wear level may indicate the number of bit corruptions in each of the flash memory pages having the respective wear level of the flash wear model 306. In some implementations, the configuration and monitor module 218 may randomly select the indicated number of bit locations from among bit locations in the flash memory page to set as corrupt in the bit mask of the wear model 306. In other implementations, the configuration and monitor module 218 may include one or more predefined bit masks for each wear level and may choose a predefined bit mask associated with the wear level to include in the wear model based on the wear level determined for that page.

In other examples, the wear model 306 may provide for simulating additional flash behavior. Such additional behaviors may be included in a static bit mask or may be simulated in some other manner depending on the particular behavior. For example, another type of flash storage behavior that may be simulated is inter-cell-interference. Inter-cell-interference is a phenomenon in which value of a bit may be affected by the values of surrounding bits. To simulate such a phenomenon, the flash wear module 304 may dynamically perform processing on the current bit value while considering the values of surrounding bits to determine whether to flip the current bit value.

In some implementations, the configuration and monitor module 218 may include a library of flash behavior and past scenarios that may be selected by the configuration device 106 to cause the virtual flash device 102 to behave like a desired type of flash with specific behaviors or wear level. Such a library may allow testing of the SSD controller 104 for a wide variety of complex flash failures or a much wider range of flash behavior without dependency on a supply chain providing flash storage devices having the desired failures, wear or other conditions. In other implementations, a library of flash behavior and past scenarios may be included on the configuration device 106 which may instead issue lower level configuration instructions to the configuration and monitor module 218 based on a user selection of from among the library at the configuration device 106.

Additionally, some implementations may utilize metadata being maintained by the book-keeping functionality of the metadata and control manager 214 to update the wear model 306 during operation. In an example implementation, the meta-data that may to be stored per page may include a program/erase (PE) counter (16 bit), a read (RD) counter (16 bit), and a wear model index number (8 bit) (e.g. an index value that points to a wear model selected for the particular page). For a 16K page size, to emulate 8 GB drive, there may be 512K entries in the meta-data table. As such, the footprint for maintaining this metadata may utilize three megabytes (3 MB) of storage in the virtual flash device or another storage location accessible to the virtual flash device.

In the above discussion, various modules of the virtual flash device are discussed as performing particular operations. However, this is not limiting and implementations may have more or less modules or the functions may be distributed differently. For example, in some implementations, the configuration and monitor module may configure the other components of the virtual flash device directly (e.g. items 204, 208, and 216) instead of having the metadata and control module relay the configuration. These and other variations would be apparent to one of ordinary skill in the art in view this disclosure.

Figure 4:
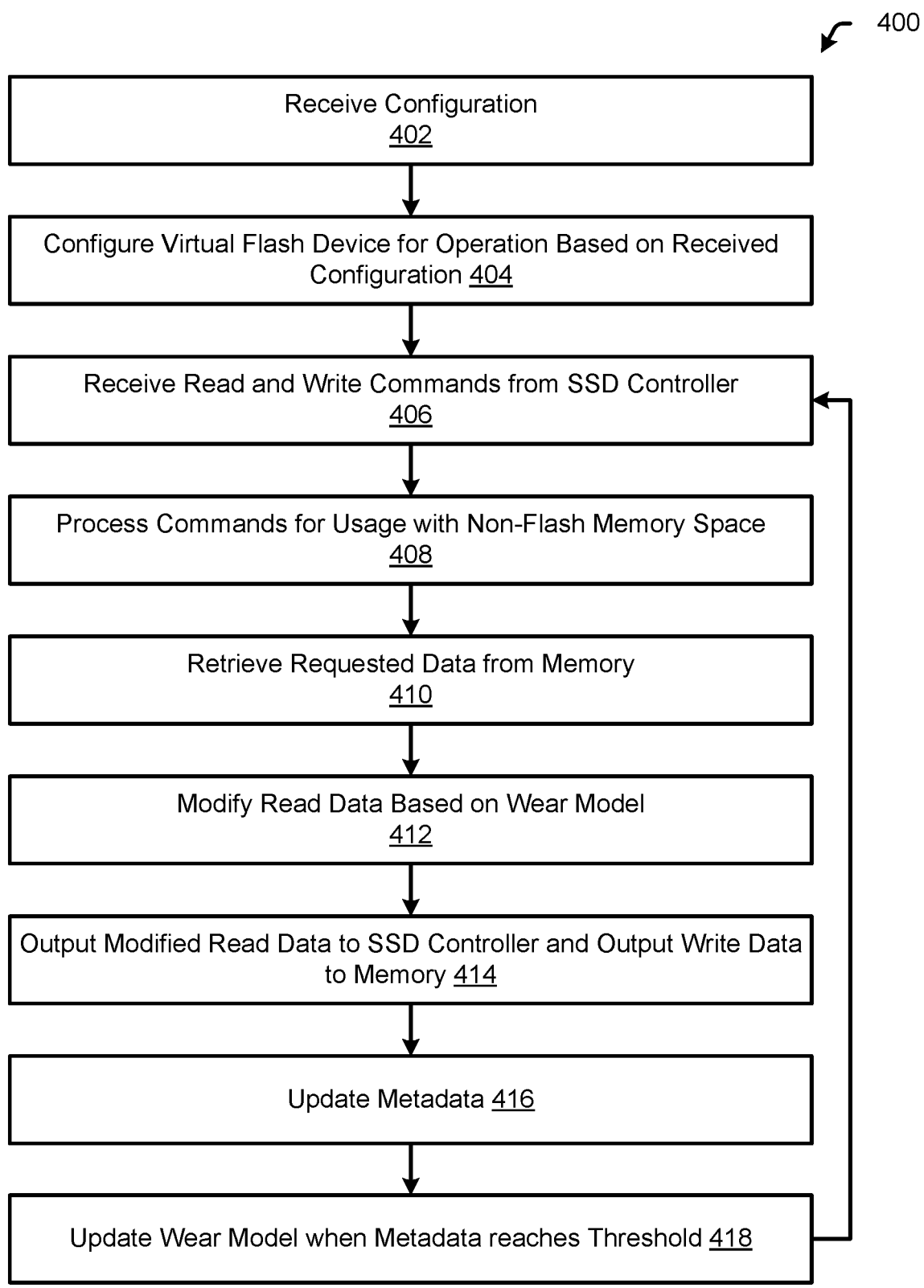
FIG. 4 is a flowchart of a method of emulating a flash storage device to a flash storage controller, in accordance with certain embodiments of the present disclosure.

Referring to FIG. 4, a flowchart of a method of emulating a flash storage device to a flash storage controller is shown and generally designated 400, in accordance with certain embodiments of the present disclosure. Specifically, FIG. 4 provides an example method of the operation of systems 100-300 to allow a virtual flash system to emulate a flash storage device to a flash storage controller, for example, for purposes of testing the behavior of the flash controller when operating with flash storage device.

At 402, the virtual flash device may receive configuration information (e.g. from a configuration device). At 404, the virtual flash device may configure itself for operation based on the received configuration. If indicated by the configuration information, this may include configuring a wear model for the read or write path which may be a transformative operation simulating wear or other flash storage device behavior. In the example of FIG. 4, the transformative operation to simulate wear is performed on the read path.

At 406, the virtual flash device may receive read and write commands from an SSD Controller. At 408, the virtual flash device may process the commands for usage with a non-flash memory space of a memory device being used as storage during the emulation. This may include an parsing the commands and an address translation operation to translate from the address space used by the SSD to issue commands to the address space used by the virtual flash device to store information to the non-flash memory.

At 410, the virtual flash device may retrieve the requested read data from the non-flash memory. At 412, the virtual flash device may modify the retrieved read data based on the configured wear model or other transformative operation. At 414, the virtual flash device may output modified read data to SSD Controller and output write data to the memory.

At 416, the virtual flash device may update metadata regarding wear, usage or other flash storage behavior (e.g. PE cycle counts). Based on the updated metadata, the virtual flash device may update the wear model (e.g. when metadata indicates a threshold or other condition has been reached). The process may then return to 406 and other commands may be processed.

Many variations would be apparent in view of this disclosure. Further, many of the features discussed herein may not be included in all implementations.

While the above description includes some embodiments that describe flash storage device implementations, the present disclosure can be applied to any system that needing to test storage controllers.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
 a virtual flash device configured to emulate a flash memory device, the virtual flash device including:
  a flash interface configured to communicate with a flash controller;
  a communication interface configured to communicate with a physical memory device that is a different type of memory than the emulated flash memory device;
  an address translation module configured to translate memory addresses from an emulated flash based memory space of the emulated flash memory device to a memory space of the physical memory device;
  a metadata and control module configured to manage metadata from the emulation of the flash memory device;

a non-flash memory controller configured to communicate with the physical memory device via the communication interface; and
a flash wear module configured to modify data on a data path between the flash controller and the physical memory device to simulate data corruption caused by wear of a flash memory device.

2. The apparatus of claim 1, further comprising:
a wear model including a bit mask for bits of a page of the emulated flash based memory space, the bit mask mapping bit flips for bits of the page of the flash based memory space; and
the flash wear module performing the modification of the data at least in part based on the wear model by flipping bits in the data based on the bit mask mapping.

3. The apparatus of claim 2, further comprising a configuration and monitor module configured to determine the bit mask for the page of the emulated flash based memory space based on a level of wear.

4. The apparatus of claim 3, further comprising the configuration and monitor module being configured to:
determine the level of wear based at least in part on a number of program erase cycles for the page of the emulated flash based memory space; and
determine a number of bits of the page of the emulated flash based memory space to be flipped based on the level of wear; and
determine the bit mask based on the number of bits of the page of the emulated flash based memory space.

5. The apparatus of claim 4, further comprising:
the metadata and control module being configured to update the number of the program erase cycles for the page of the emulated flash based memory space in response to a program erase cycle of the page occurring during an emulation operation; and
the configuration and monitor module configured to modify the wear model based on the updated number of the program erase cycles for the page of the emulated flash based memory space.

6. The apparatus of claim 5, further comprising the flash wear module further configured to determine at least one bit of the page of the emulated flash based memory space to be flipped to simulate inter-cell interference based at least in part on values of the at least one bit and one or more bits surrounding the at least one bit.

7. The apparatus of claim 1, further comprising:
the physical memory device coupled to the virtual flash device, the physical memory device including a DDR SDRAM memory device.

8. The apparatus of claim 1, further comprising the virtual flash device comprising a field programmable gate array (FPGA).

9. A device comprising:
a virtual flash device configured to emulate a flash memory device, the virtual flash device including:
a flash interface configured to communicate with a flash controller;
an address translation module configured to translate memory addresses from a flash based memory space to a DDR SDRAM memory space of a DDR SDRAM memory device;
a flash wear module configured to modify data on a data path between the flash controller and the DDR SDRAM memory device to simulate data corruption caused by flash memory device behavior of a flash memory device;
a metadata and control module configured to manage metadata from the emulation of the flash memory device; and
a DDR SDRAM controller configured to communicate with the DDR SDRAM memory device.

10. The device of claim 9, further comprising:
a wear model including a bit mask for bits of a page of the flash based memory space, the bit mask mapping bit flips for bits of the page of the flash based memory space; and
the flash wear module performing the modification of the data at least in part based on the bit flips mapped in the bit mask wear model.

11. The device of claim 10, further comprising a configuration and monitor module configured to determine the bit mask for the page of the flash based memory space based on a level of wear.

12. The device of claim 11, further comprising the configuration and monitor module being configured to:
determine the level of wear based at least in part on a number of program erase cycles for the page of the flash based memory space; and
determine a number of bits of the page of the flash based memory space to be flipped based on the level of wear; and
determine the bit mask based on the number of bits of the page of the flash based memory space.

13. The device of claim 12, further comprising:
the metadata and control module being configured to update the number of the program erase cycles for the page of the flash based memory space in response to a program erase cycle of the page occurring during an emulation operation; and
the configuration and monitor module configured to modify the wear model based on the updated number of the program erase cycles for the page of the flash based memory space.

14. The device of claim 13, further comprising the flash wear module further configured to determine at least one bit of the page of the page of the flash based memory space to be flipped to simulate inter-cell interference based at least in part on values of the at least one bit and one or more bits surrounding the at least one bit.

15. The device of claim 13, further comprising the data path being a read data path.

16. A method comprising:
configuring a virtual flash device to emulate a flash memory device, the virtual flash device including a flash interface configured to communicate with a flash controller and a DDR SDRAM controller configured to communicate with a DDR SDRAM memory device;
receiving a read command from the flash controller;
translating a memory address from a flash based memory space included in the read command to a DDR SDRAM memory space of a DDR SDRAM memory device;
retrieving data from the DDR SDRAM memory device using the translated memory address;
modifying the retrieved data to simulate data corruption caused by wear in the emulated flash memory device; and
outputting the modified data to the flash controller as a response to the read command.

17. The method of claim 16, further comprising:
receiving configuration information including flash memory device wear information for the emulation by the virtual flash device, the wear information including metadata that specifies a number of program erase cycles for a page of the flash based memory space;

determining a wear model for the emulation by the virtual flash device including a bit mask for bits of the page of the flash based memory space, the bit mask mapping bit flips for bits of the page of the flash based memory space; and the modifying of the retrieved data being based on the wear model.

18. The method of claim 17, further comprising:

receiving an erase command from the flash controller to erase data stored to a block including the page of the flash based memory space;

updating the number of program erase cycles for the page of the flash based memory space based on the erase command; and modifying the wear model based on the updated number of the program erase cycles for the page of the flash based memory space.

19. The method of claim 16, further comprising:

the modifying of the retrieved data including determining at least one bit of the page of the flash based memory space to be flipped to simulate inter-cell interference based at least in part on values of the at least one bit and one or more bits surrounding the at least one bit.

* * * * *